(12) United States Patent
Takahashi

(10) Patent No.: US 10,295,985 B2
(45) Date of Patent: May 21, 2019

(54) PROGRAM PROCESSING APPARATUS AND PROGRAM

(71) Applicant: OMRON Corporation, Kyoto-shi, Kyoto (JP)

(72) Inventor: Daisuke Takahashi, Moriyama (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/684,996

(22) Filed: Aug. 24, 2017

(65) Prior Publication Data
US 2018/0081338 A1 Mar. 22, 2018

(30) Foreign Application Priority Data

Sep. 16, 2016 (JP) ................................ 2016-181149

(51) Int. Cl.
| | | |
|---|---|---|
| *G06F 9/44* | (2018.01) | |
| *G05B 19/05* | (2006.01) | |
| *G06F 9/451* | (2018.01) | |
| *G06F 3/0484* | (2013.01) | |
| *G06F 8/38* | (2018.01) | |
| *G06F 8/41* | (2018.01) | |
| *H04L 29/08* | (2006.01) | |
| *G06F 8/34* | (2018.01) | |

(52) U.S. Cl.
CPC ......... *G05B 19/05* (2013.01); *G06F 3/04847* (2013.01); *G06F 8/38* (2013.01); *G06F 8/4435* (2013.01); *G06F 9/451* (2018.02); *G05B 2219/13144* (2013.01); *G06F 8/34* (2013.01); *H04L 67/125* (2013.01)

(58) Field of Classification Search
CPC ............. G06F 8/4435; G06F 8/34; G06F 8/38
See application file for complete search history.

(56) References Cited

U.S. PATENT DOCUMENTS

| | | | |
|---|---|---|---|
| 2005/0091275 A1* | 4/2005 | Burges | ............. G06F 17/30017 |
| 2012/0284631 A1* | 11/2012 | Lancioni | ................... G06F 8/38 |
| | | | 715/744 |
| 2013/0268927 A1 | 10/2013 | Cochran | |

(Continued)

FOREIGN PATENT DOCUMENTS

JP    2016-506559 A    3/2016

OTHER PUBLICATIONS

Alapan Arnab and Andrew Hutchison, Verifiable Digital Object Identity System, ACM, 2006, retrieved online Feb. 16, 2019, pp. 19-25. Retrieved from the Internet:<URL: http://delivery.acm.org/10.1145/1180000/1179514/p19-arnab.pdf?>. (Year: 2006).*

(Continued)

*Primary Examiner* — Hanh Thi-Minh Bui
(74) *Attorney, Agent, or Firm* — Metrolexis Law Group, PLLC

(57) ABSTRACT

A program processing apparatus processes an HMI program for factory automation. The program processing apparatus includes a control unit that controls the program processing apparatus. The control unit includes a detection unit that detects, based on at least a data type and a data size, identical sets of user interface data from a data group including a plurality of sets of user interface data corresponding to UI functions of the HMI program, and a change unit that changes the data group to include only one of the identical sets of user interface data.

8 Claims, 18 Drawing Sheets

(56) References Cited

U.S. PATENT DOCUMENTS

2015/0199367 A1* 7/2015 Hammer ............ G06F 17/30085
                                                              707/654
2015/0309774 A1   10/2015 Lodwidge et al.
2017/0286522 A1*  10/2017 Hohwald ................ G06F 16/54

OTHER PUBLICATIONS

The extended European search report dated Jan. 23, 2018 in a counterpart European patent application.

* cited by examiner

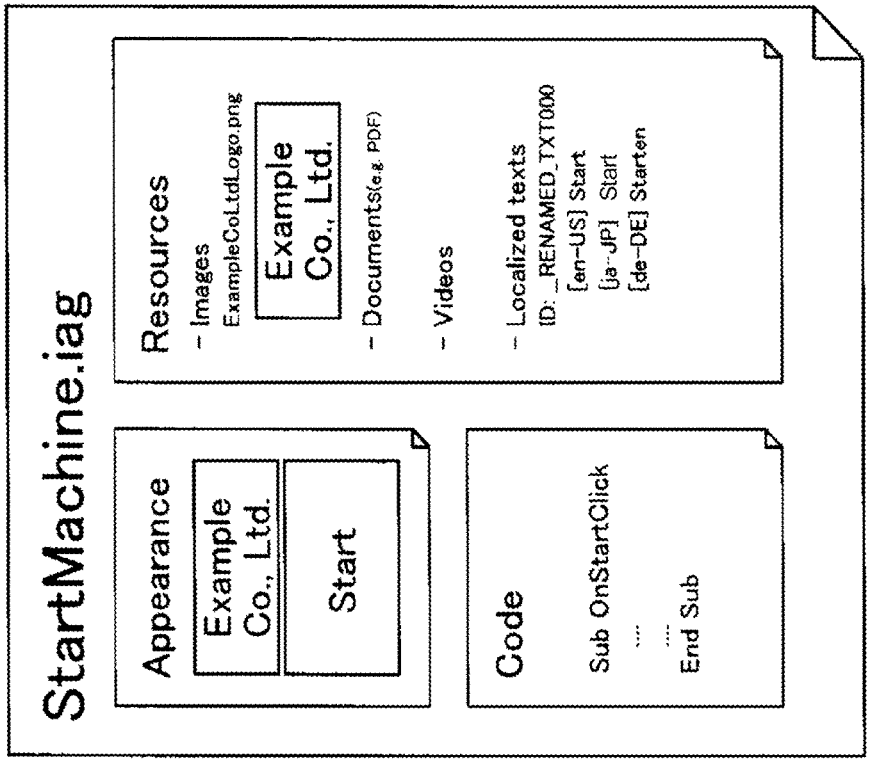
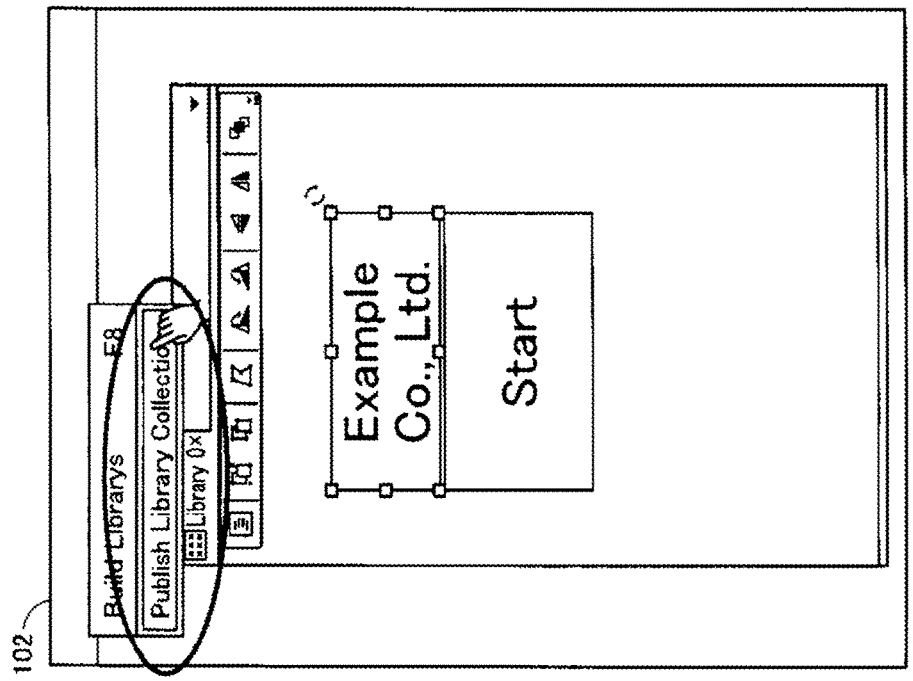
FIG.12

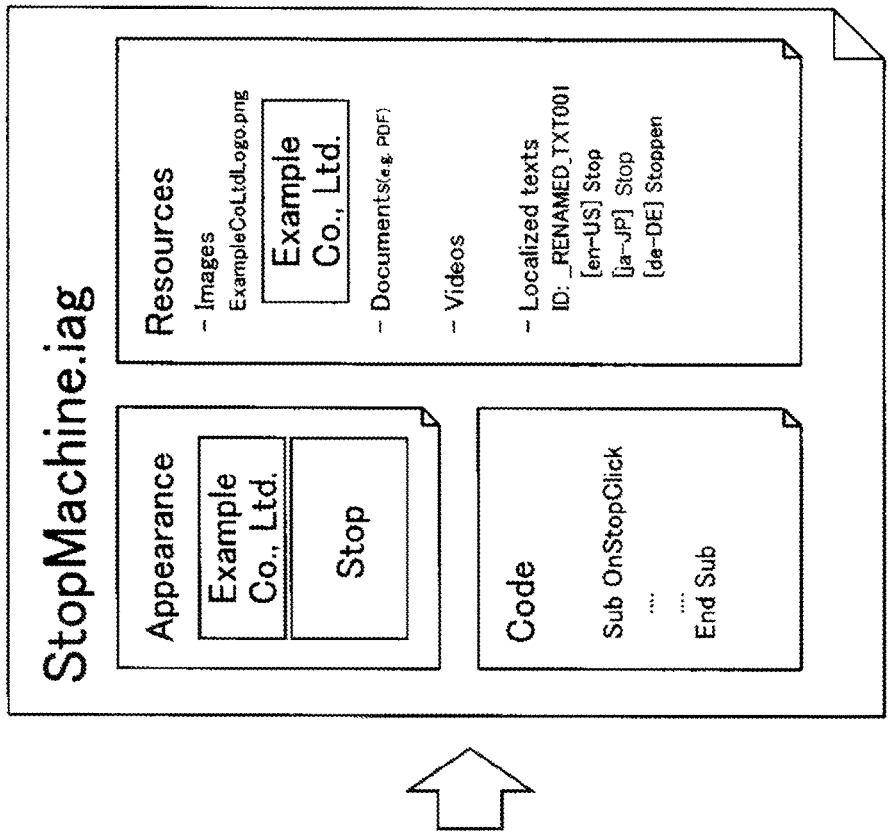
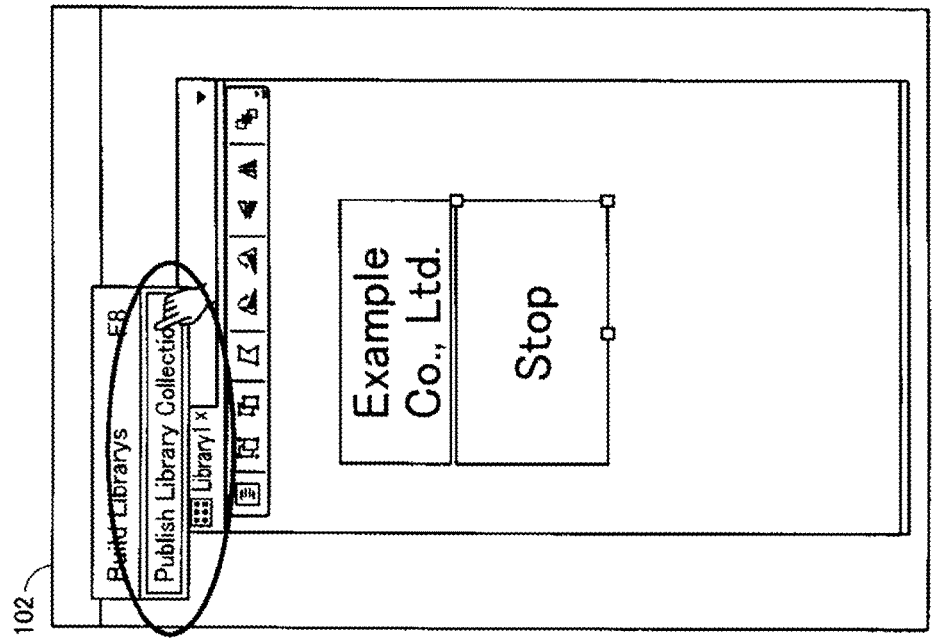
FIG.13

PROGRAM PROCESSING APPARATUS AND PROGRAM

CROSS REFERENCE TO RELATED APPLICATIONS

This application claims priority from prior Japanese Patent Application No. 2016-181149 filed with the Japan Patent Office on Sep. 16, 2016, the entire contents of which are incorporated herein by reference.

FIELD

The disclosure relates to a program processing apparatus and a program, and more particularly, to a program processing apparatus and a program for optimizing application programs for a human machine interface (HMI) used in factory automation (FA).

BACKGROUND

A programmable terminal used in the field of factory automation (FA) is a touch-screen input device. The programmable terminal is operated by a user (herein refers to a person who designs or implements the screens of the programmable terminal) to serve as a human machine interface (HMI), allowing the user to create screens intended for his or her purpose and also to input data.

To allow the user to efficiently create applications, objects or programs to be used frequently may be combined and packaged preliminary, and may then be used repeatedly. For example, Patent Literature 1 (Japanese Translation of PCT International Application Publication No. 2016-506559) describes a method for allowing easy reuse of packaged objects.

CITATION LIST

Patent Literature

Patent Literature 1: Japanese Translation of PCT International Application Publication No. 2016-506559

SUMMARY

Technical Problem

Packages are created independently of one another. One package may include resources (such as image files and movie files) identical to resources included in another package. Different packages including such identical resources can use more space in the internal storage of a device such as a programmable terminal, more memory capacity in operating applications, or more time in loading resources, than they are actually needed. Patent Literature 1 describes no solution to this issue.

One or more aspects are directed to a program processing apparatus and a program for optimizing memory consumption and transfer for HMI programs.

Solution to Problem

A program processing apparatus according to a first aspect processes a human machine interface program for factory automation. The program processing apparatus includes a control unit that controls the program processing apparatus. The control unit includes a detection unit that detects, based on at least a data type and a data size, identical sets of user interface data from a data group including a plurality of sets of user interface data corresponding to user interface functions of the human machine interface program, and a change unit that changes the data group to include only a first set of user interface data that is one of the identical sets of user interface data.

In some embodiments, the data group includes a plurality of libraries for storing the user interface data. The detection unit includes an identical data detection unit that detects identical sets of user interface data based on at least the data type and the data size from sets of user interface data stored in different libraries. The change unit includes a library change unit that changes the libraries to include only the first set of user interface data that is one of the identical sets of user interface data.

In some embodiments, the detection unit detects data identicality when the sets of user interface data of the data group are created.

In some embodiments, the detection unit detects data identicality when the human machine interface program is compiled.

In some embodiments, the detected identical sets of user interface data include the first set of user interface data and a second set of user interface data. The control unit further includes a reference definition unit that defines, in a portion of the human machine interface program that refers to the second set of user interface data, reference data that refers to the first set of user interface data.

In some embodiments, the reference definition unit defines the reference data when the human machine interface program is compiled.

In some embodiments, the program processing apparatus includes a display, and a display controller that controls the display in accordance with display data.

The control unit further includes a generation unit that generates association information between an identifier of the second set of user interface data and an identifier of the first set of user interface data defined in the portion referred to by the second set of user interface data. The control unit outputs display data for displaying the created association information to the display controller.

Another aspect provides a program. The program enables a processor included in an information processing apparatus to implement a method for processing a human machine interface program for factory automation. The method includes detecting, based on at least a data type and a data size, identical sets of user interface data from a data group including a plurality of sets of user interface data corresponding to user interface functions of the human machine interface program, and changing the data group to include only a first set of user interface data that is one of the identical sets of user interface data.

BRIEF DESCRIPTION OF THE DRAWINGS

FIG. 12 is a diagram illustrating an example in which identical resources R are created.

FIG. 13 is a diagram illustrating another example in which identical resources R are created.

DETAILED DESCRIPTION

Figure 1:
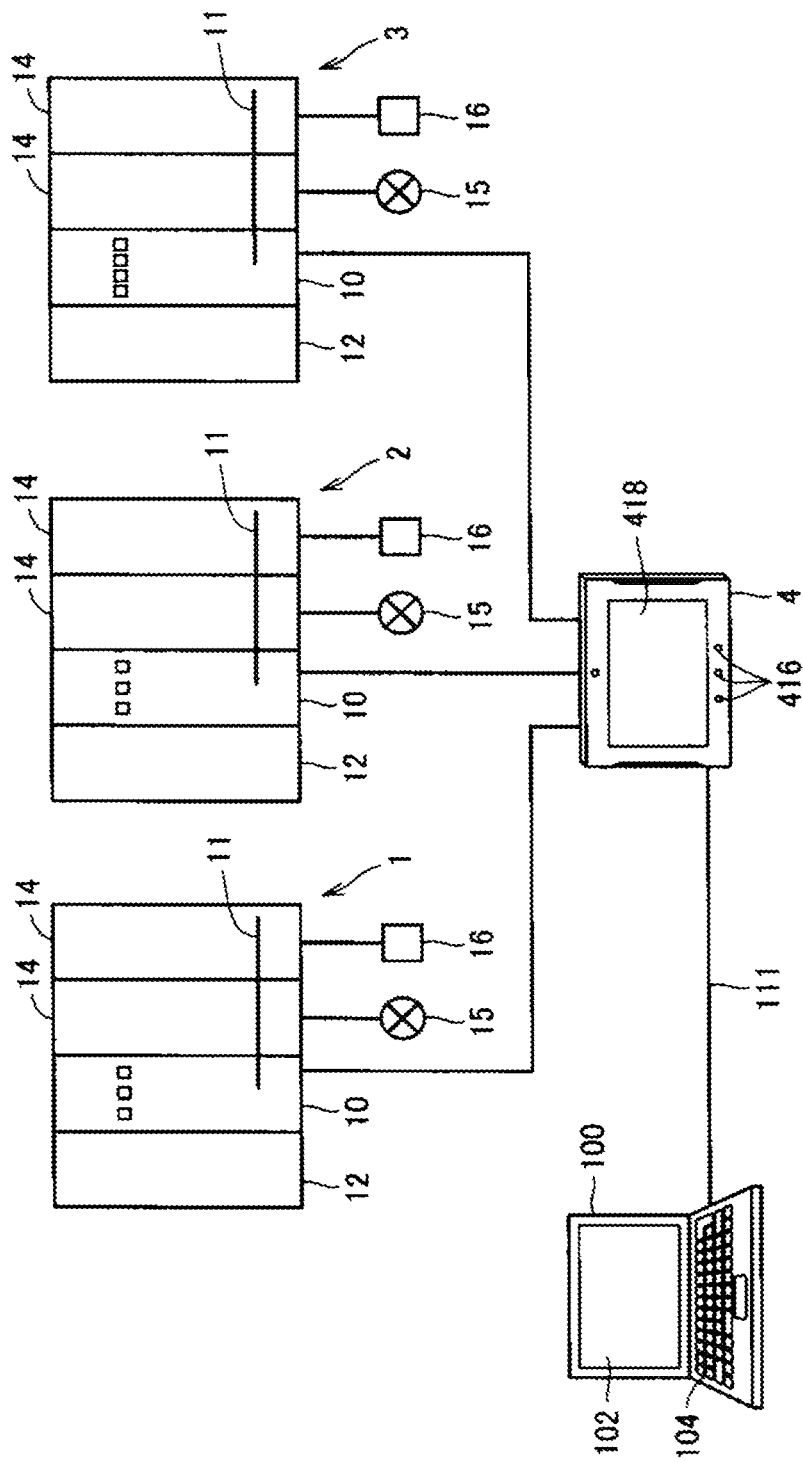
FIG. 1 is a schematic diagram illustrating the configuration of a programmable system according to a first embodiment.

Embodiments will now be described in detail with reference to the drawings. The same components or units in the figures are given the same reference numerals, and have the same names and the same functions. They will not be described in detail redundantly.

Terms

A human machine interface (HMI) program is an application program. An HMI program contains information about the arrangement of objects on screens, program codes, and setting data that are used for operating a programmable terminal.

A user interface (UI) library is a library (file) for a UI component that may be used (reused) in an HMI program. A UI component includes image data, text data, and program codes corresponding to UI data. When an HMI program is executed, the UI component enables the UI functions (e.g., image display, data input and output, and acceptance of operations).

A resource includes data to be incorporated into screen data, such as image data and text data. A resource may include program codes. A UI library stores files of data representing resources that serve as UI components.

A project is a set of information for creating one application program.

A UI library project is a project for creating the UI library described above.

A standard project is a project for creating an HMI program. A project for creating an HMI program includes at least one UI library storing resource data that is referred to by the HMI program, page list data, definition of variables, user-defined data types, and setting data associated with communication.

A UI library package is a single file storing appearance definition, program codes, and resources for forming a UI library to allow the UI library to be imported into the standard project. A UI library package is generated when a predetermined operation defined in a UI library project is performed.

First Embodiment

Overview

In a first embodiment, an HMI application processing apparatus (hereafter, a processing apparatus) groups resources (equivalent to UI data for enabling UI components or UI functions) that have both the same data type and the same data length included in a standard project. The processing apparatus determines the type of data based on an extension of a file storing data representing resources.

The processing apparatus retains one resource for each group and deletes the other resource(s) (deletion process). Through this deletion process, the processing apparatus defines (rewrites) reference data in a portion of the HMI program previously referencing the deleted resource(s) in the standard project. The reference data provides a reference to the retained resources.

In this manner, when an HMI program in a standard project refers to identical resources (redundant resources), one resource is retained and the other resource(s) is deleted in the standard project (specifically, the UI library). This reduces the data size of the standard project, and reduces memory consumption when the standard project is stored into a memory. This also reduces the memory capacity needed to execute the HMI program of the standard project. This may further shorten the time taken to load (transfer and store) the standard project to the apparatus through communication or via a storage medium.

The above deletion process is one implementation of the process for changing a UI library to include only one set of UI data determined to be identical in each group (change process). The change process is not limited to the deletion process. For example, sets of UI data that are determined to be identical may first be deleted from the UI library, and one set of such UI data corresponding to each group may be newly created and added to the UI library. For ease of the explanation, the above deletion process is one example of the change process in a first embodiment.

Although a UI data group stored in a UI library is an example data group including a plurality of sets of UI data in embodiments described below, the data group may not be stored in a library but may be in any other format.

System Configuration

FIG. 1 is a schematic diagram showing the configuration of a programmable system according to a first embodiment. As shown in FIG. 1, the programmable system includes programmable logic controllers (PLCs) 1 to 3, which are used in factory automation (FA), a programmable terminal 4, and a personal computer (PC) 100. The PLCs 1 to 3 have the same structure. Each PLC typically includes a central processing unit (CPU) module 10, which includes a CPU mainly responsible for executing programs, a power supply unit 12, which supplies power to the CPU module 10 and other units, and an input-output (IO) unit 14, which transmits and receives signals to and from field devices. The IO unit 14 is connected to the CPU module 10 with a system bus 11. The IO unit 14 typically obtains signals from a detection sensor 15, which is a field device, and drives a relay 16, which is also a field device, in accordance with a result of program execution in the CPU module 10. The field devices may include devices other than the detection sensor 15 and the relay 16.

The programmable terminal 4 functions as a graphical user interface (GUI) for an HMI. The programmable terminal 4 performs various processes, including communicating with the CPU modules 10 in the PLCs 1 to 3, displaying information about each PLC on the display of a touch screen 418, and transferring instructions input from a user via an operation key 108 to the PLCs 1 to 3. The programmable terminal 4 displays various screens, including a UI screen for performing a communication process, a display process, and an input process, on a display 107. The programmable terminal 4 generates data used for displaying such screens by implementing a project. The generated screen data then drives the display 107 to display the screen.

The PC 100 is one implementation of a program processing apparatus for processing HMI programs. The PC 100 is connected to the programmable terminal 4 via a wired or wireless communication channel 111. The PC 100 provides the user with an environment for developing (generating) projects. A project generated in the PC 100 is transmitted to the programmable terminal 4. The communication channel 111 includes, for example, a local area network (LAN).

Configuration of PC 100

Figure 2:
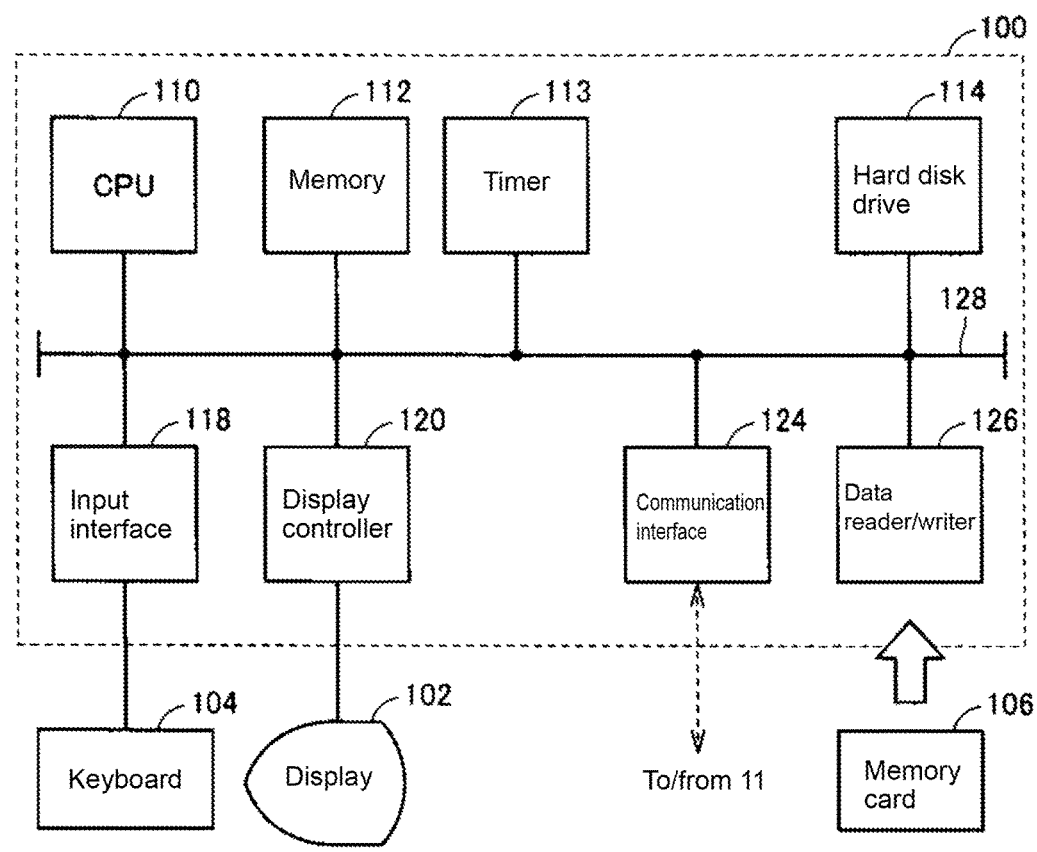
FIG. 2 is a schematic diagram illustrating the configuration of a PC 100 according to a first embodiment.

FIG. 2 is a schematic diagram showing the configuration of the PC 100 according to a first embodiment. As shown in FIG. 2, the PC 100 includes a CPU 110, a memory 112 and a hard disk drive 114 as memory units, a timer 113, which counts time and outputs the time data to the CPU 110, an input interface 118, a display controller 120, a communication interface 124, and a data reader/writer 126. These components are connected to each other with a bus 128 in a communicable manner.

The CPU 110 performs various operations by executing programs (codes) stored in the hard disk drive 114. The memory 112 is typically a nonvolatile memory device, such as a dynamic random access memory (DRAM). The memory 112 stores programs and data read from the hard disk drive 114, as well as data received from the data reader/writer 126 and work data.

The input interface 118 interfaces data transmission between the CPU 110 and input devices, including a keyboard 104, a mouse (not shown), and a touch panel (not shown). In other words, the input interface 118 receives operating instructions provided by the user operating the input devices.

The display controller 120 is connected to a display 102, which is a typical example of display apparatuses, and displays the results of processing performed in the CPU 110. The display controller 120 drives the display 102 in accordance with display data from the CPU 110. This causes images in accordance with the display data to appear on the display 102.

The communication interface 124 interfaces data transmission with an NA4 via the LAN. The data reader/writer 126 interfaces data transmission between the CPU 110 and a memory card 106, which is an external storage medium.

The memory card 106 storing data such as programs executed by the PC 100 is distributed. The data reader/writer 126 reads programs from this memory card 106. The memory card 106 includes general-purpose semiconductor memory devices, such as a compact flash (CF) card and a secure digital (SD) card, magnetic storage media, such as a flexible disk, and optical storage media, such as a compact disk read only memory (CD-ROM).

Other output devices, such as a printer, may be connected to the PC 100 as appropriate.

Configuration of Programmable Terminal 4

Figure 3:
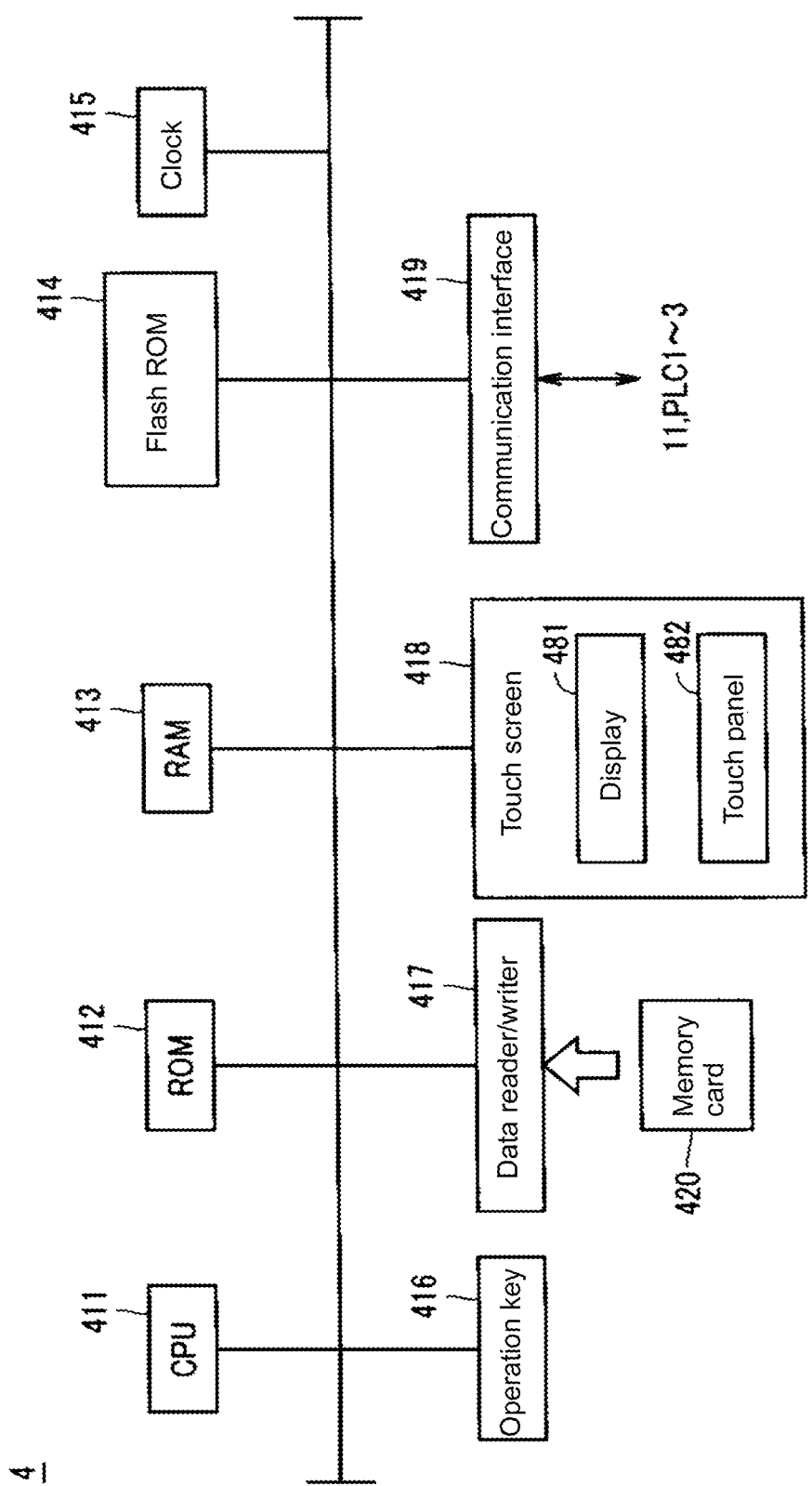
FIG. 3 is a schematic diagram illustrating the configuration of a programmable terminal 4 according to a first embodiment.

FIG. 3 is a schematic diagram showing the configuration of the programmable terminal 4 according to a first embodiment. As shown in FIG. 3, the programmable terminal 4 includes a CPU 411, which performs various operations, a read only memory (ROM) 412, a random access memory (RAM) 413, a flash ROM 414, which is used to store various programs and data in a nonvolatile manner, a clock 415, an operation key 416, which is used to receive user operations, a data reader/writer 417, a touch screen 418, and a communication interface 419. These components are connected to each other with an internal bus.

The touch screen 418 includes a display 481, which functions as a display unit, and a touch panel 482, which is used to receive user operations. The touch panel 482 covers the display 481. The communication interface 419 communicates with the PC 100 and the PLCs 1 to 3.

The data reader/writer 417 interfaces data transmission between the CPU 411 and a memory card 420, which is an external storage medium. The memory card 420 storing data such as programs executed by the programmable terminal 4 may be distributed. The data reader/writer 126 reads programs from the memory card 420. The memory card 420 includes general-purpose semiconductor memory devices, such as a CF card and an SD card, magnetic storage media, such as a flexible disk, and optical storage media, such as a CD-ROM.

Other output devices, such as a printer, may be connected to the programmable terminal 4 as appropriate.

Development Environment for HMI Programs

Figure 4:
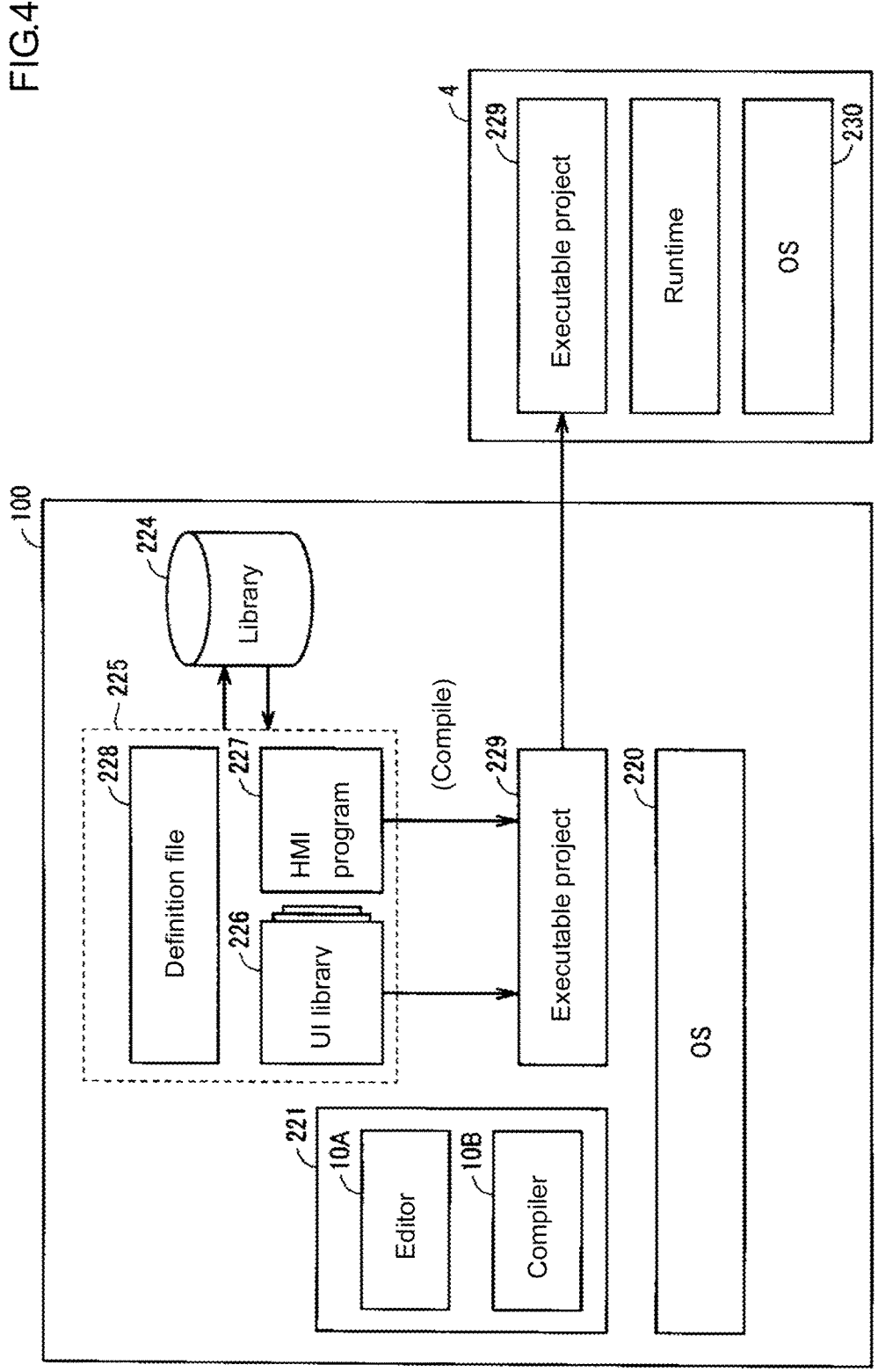
FIG. 4 is a schematic diagram illustrating the development environment for HMI programs according to a first embodiment.

FIG. 4 is a schematic diagram showing the development environment for HMI programs according to a first embodiment. FIG. 4 shows the execution environment for an HMI program in the programmable terminal 4, associated with the development environment in the PC 100.

Referring now to FIG. 4, the development environment of the PC 100 includes an operating system (OS) 220 and an HMI device tool program 221. The HMI device tool program 221 may be loaded from the hard disk drive 114 to the memory 112. The HMI device tool program 221 includes an editor 10A for creating HMI programs, UI libraries, and various projects, and a compiler 10B for compiling various projects. The PC 100 includes a library 224 containing data such as resources, and data including functions for creating UI libraries and HMI programs. The HMI program includes, for example, the arrangement of displayed elements, definitions of the appearance, and operation instructions in a programming language.

In a first embodiment, the compiler 10B compiles a standard project 225 created by the editor 10A. The user usually creates a UI library referred to by an HMI program 227 before the standard project 225 is compiled. The standard project 225 is created and edited using the data stored in the library 224. The standard project 225 includes at least one UI library 226, an HMI program 227, which refers to the resource for the UI library 226, and a definition file 228, which lists the definitions of various types of data. The standard project 225 is stored in a memory unit 90 in FIG. 5 (described later). The memory unit 90 includes memory areas, such as the hard disk drive 114 and the memory 112.

To compile the standard project 225, the user activates the compiler 10B. The compiler 10B compiles the stored standard project 225 by performing processes such as parser processing, and outputs an executable project 229, which has been converted into an executable code. The executable project 229 is stored in the memory unit 90. The compiling process includes the above deletion to reduce the data size of the standard project 225. The deletion process will be described in detail later.

The PC 100 loads the executable project 229 to the programmable terminal 4 via the communication channel 111. The programmable terminal 4 stores the executable project 229 transferred from the PC 100 into, for example, the flash ROM 414.

When the operator of the programmable terminal 4 instructs execution of an HMI program, the executable project 229 is read from the flash ROM 414 and the read executable project 229 is executed using a runtime program under control of the OS 230 of the programmable terminal 4.

Functional Configuration

Figure 5:
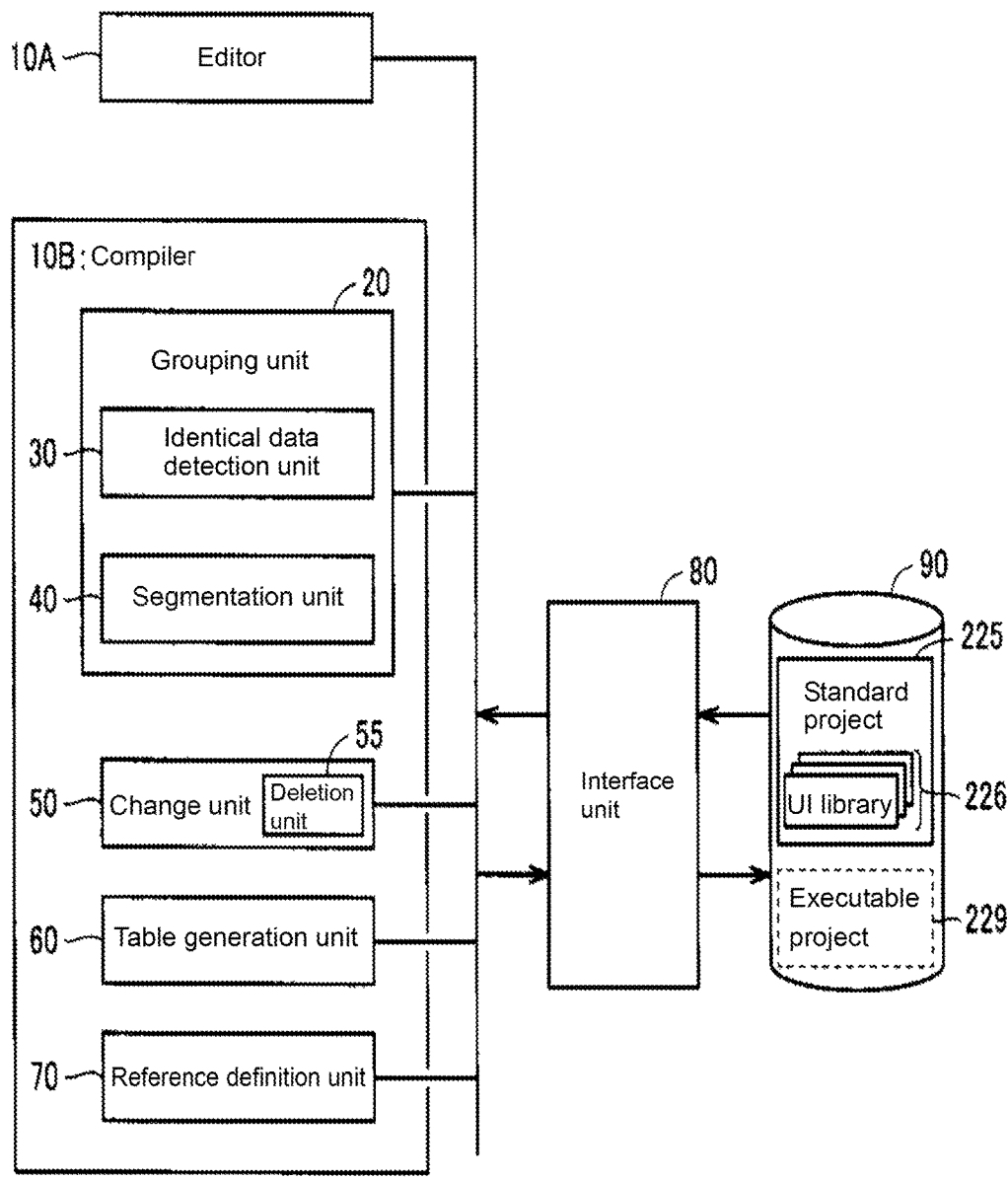
FIG. 5 is a schematic diagram illustrating a compiler 10B and its peripheral units according to a first embodiment.

FIG. 5 is a schematic diagram showing the compiler 10B according to a first embodiment and its peripheral units. FIG. 5 shows the editor 10A, an interface unit 80, and the memory unit 90 associated with the compiler 10B. The editor 10A creates various types of data, including UI libraries, resources, and projects, and programs in accordance with user operations. The compiler 10B compiles various types of data and programs created by the editor 10A.

The compiler 10B includes a grouping unit 20, which groups the identical resources R in the standard project 225 into groups in association with the deletion process described above when the compiler 10B compiles the standard project 225 created by the editor 10A, a change unit 50, which changes the standard project 225 to include only one resource R determined to be identical to (or to overlap with) each grouped resource R, a table generation unit 60, and a reference definition unit 70. The group of the resources R determined to be identical (to overlap) includes the above one resource R and the other resources R. The reference definition unit 70 defines reference data for instructing portions of the HMI program 227 that refer to the other resources R to refer to one resource R. The table generation unit 60 generates information (resource replacement table TB) associating the identifiers of the above other resources R with the identifier of the above one resource R to be referred to by the other resources R.

In the example described below, a deletion unit 55, which is included in the change unit 50, performs the above change process for allowing each group to include only one of the redundant resources R (equivalent to one resource above) and deleting the other resources R (equivalent to the other resources above). When the deletion process is performed, the table generation unit 60 generates a table (resource replacement table TB) showing the correspondence between the deleted resources R and the retained resource R. The reference definition unit 70 identifies portions of the HMI program 227 that are referred to by the deleted resources R, and defines reference data for providing a reference to the retained resource R in each of these portions.

The grouping unit 20 includes an identical data detection unit 30, which detects the identical resources R, the group of the detected identical resources R, and a segmentation unit 40, which divides these groups into smaller groups.

Flowchart for Processing

Figure 6:
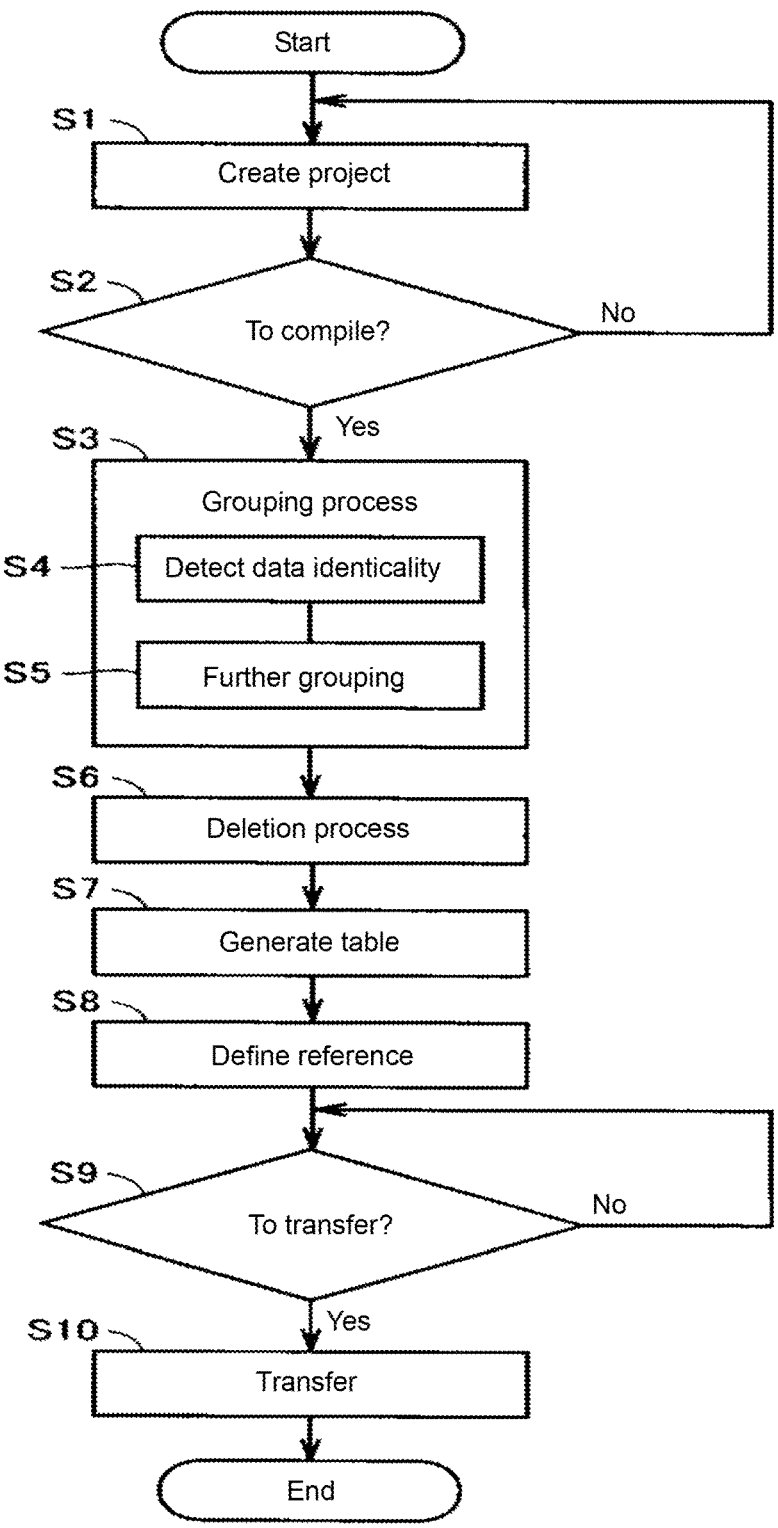
FIG. 6 is a flowchart illustrating the processing according to a first embodiment.

FIG. 6 is a flowchart showing the processing according to a first embodiment. The processing shown in FIG. 6 is stored in, for example, the memory 112 or the hard disk drive 114 as a program, and is read and executed by the CPU 110. This program stored in the memory card 106 may be distributed. The CPU 110 reads the program from the memory card 106 via the data reader/writer 126, and stores the read program into the hard disk drive 114 or the memory 112.

The program may be received by the communication interface 124 via a network (not shown). The CPU 110 may store the received program into the memory 112 or the hard disk drive 114.

FIGS. 7A to 7D are schematic diagrams showing a process for deleting the resource R according to a first embodiment. In FIGS. 7A to 7D, the memory unit 90 is divided into an area E1 for storing the UI library 226 of the standard project 225, and an area E2 for storing the resource replacement table TB for descriptive purpose. FIGS. 8 to 11 are diagrams showing examples of the process for deleting the resource R according to a first embodiment.

The user first activates the editor 10A, and creates the standard project 225. The created standard project 225 is stored into the memory unit 90. At the same time, the identical resource R is imported (added) into the standard project 225. This process will be described later in detail.

After the standard project 225 has been created, the user starts an operation for compiling the standard project 225.

The CPU 110 determines whether to accept an instruction for staring the compilation process from the user (step S2). When the CPU 110 rejects an instruction for starting the compilation process (No in step S2), the processing returns to the processing in step S1. When the CPU 110 accepts an instruction for starting the compilation process (Yes in step S2), the CPU 110 activates the compiler 10B.

When the compiler 10B is activated, the grouping unit 20 groups the resources R (step S3). More specifically, the identical data detection unit 30 groups a plurality of resources R stored in the UI library 226 in the area E1 in FIG. 7A into at least one group G of resources R with the same data type and the same data length (refer to FIG. 7B). The identical data detection unit 30 determines the data type based on the extension of the data file of each resource R. In the specific example of FIG. 8, the resources R in the area E1 (specifically, the UI library 226) are grouped into a group G1 with the data type of BMP and the data length of 400 bytes, a group G2 with the data type of BMP and the data length of 500 bytes, and a group G3 with the data type of PNG and the data length of 100 bytes (refer to FIG. 8).

Figure 8:
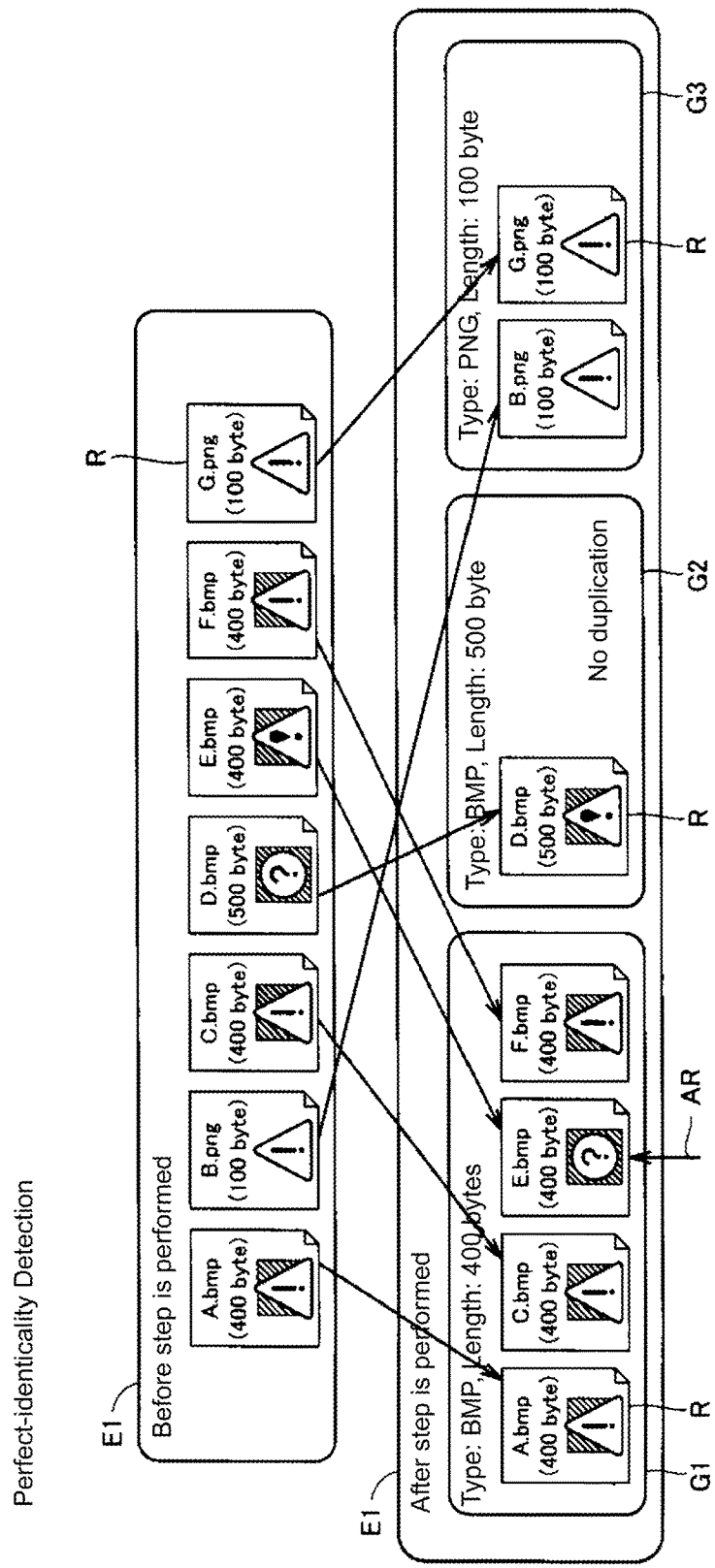
FIG. 8 is a diagram illustrating one example of a process for deleting a resource R according to a first embodiment.

Although the resource R with the arrow in the group G1 in FIG. 8 is image data different from the other resources in the group, this resource is currently in the group G1.

In this manner, the identical data detection unit 30 detects the identical resources R used (stored) in a plurality of UI libraries in accordance with the simple criteria, which are the data type and the data length. Although the UI libraries are packaged and created individually, these simple (uncomplicated) criteria allow relatively high speed detection of the identical resources R from these UI libraries.

In the data identicality grouping based on the data type and the data length above, image data (resource R) different from other resources R may be included in one group. To avoid this, the data identicality of the resource R is detected more precisely. More specifically, the identical data detection unit 30 detects data identicality in each group G including two or more resources R (step S4). Based on the detection result, the segmentation unit 40 further groups the resources R of the group G by other equivalences (step S5). In step S4, the identical data detection unit 30 determines the equivalences of the resources R in each group with the procedure described below.

a. Resources R having different hash values are determined to be different resources R.

b. When each of the resources R that are not determined to be different in (a) above has the same values of all the bytes, these resources are determined to be identical. When these resources do not have the same values, these resources are determined to be different.

Figure 9:
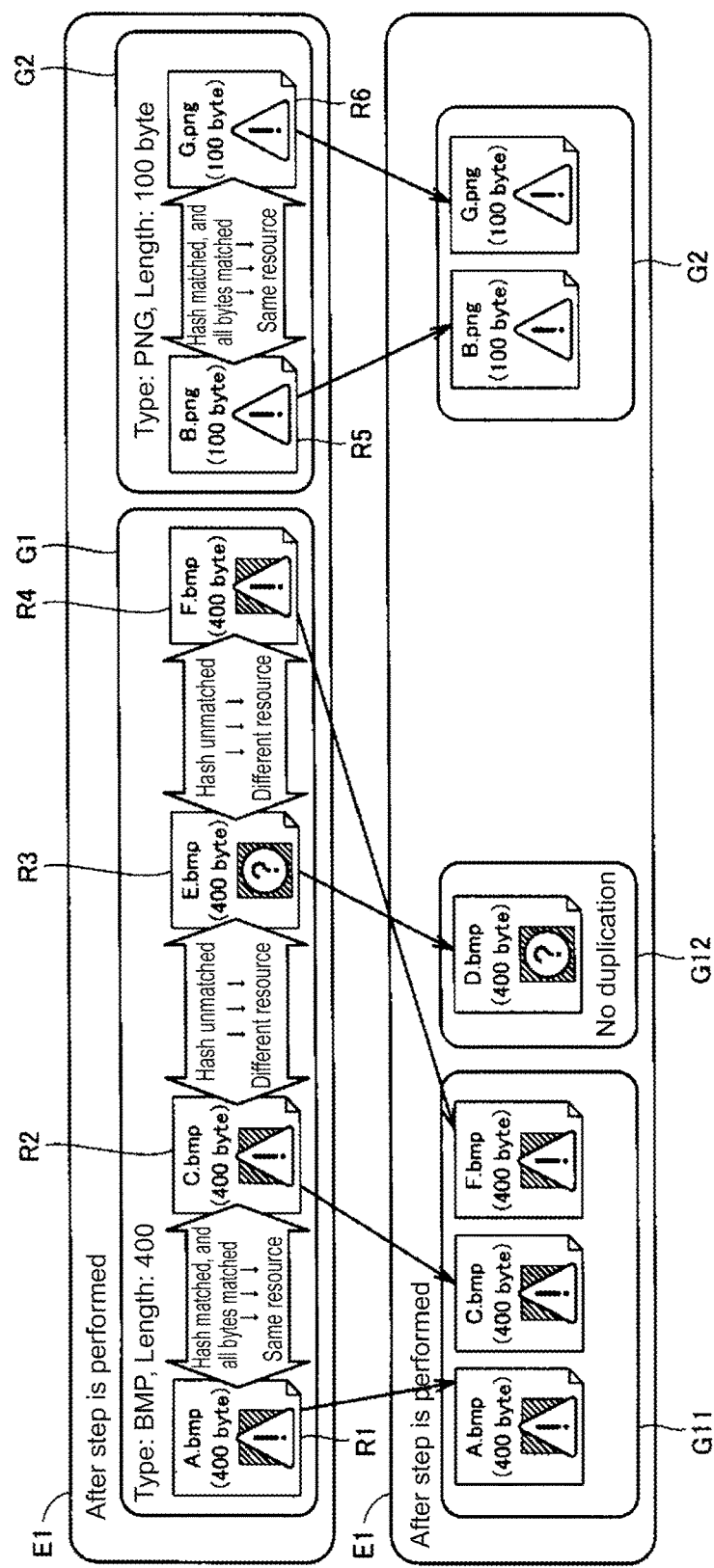
FIG. 9 is a diagram illustrating another example of a process for deleting a resource R according to a first embodiment.

The processes performed by the identical data detection unit 30 and the segmentation unit 40 described above may further group the resources R in the group G1 in FIG. 8 into groups G11 and G12 shown in FIG. 9. The groups G11 and G12 each include the identical resources R. The resources R in the group G2 are determined to be identical, and thus are not to be grouped further.

Figure 7:
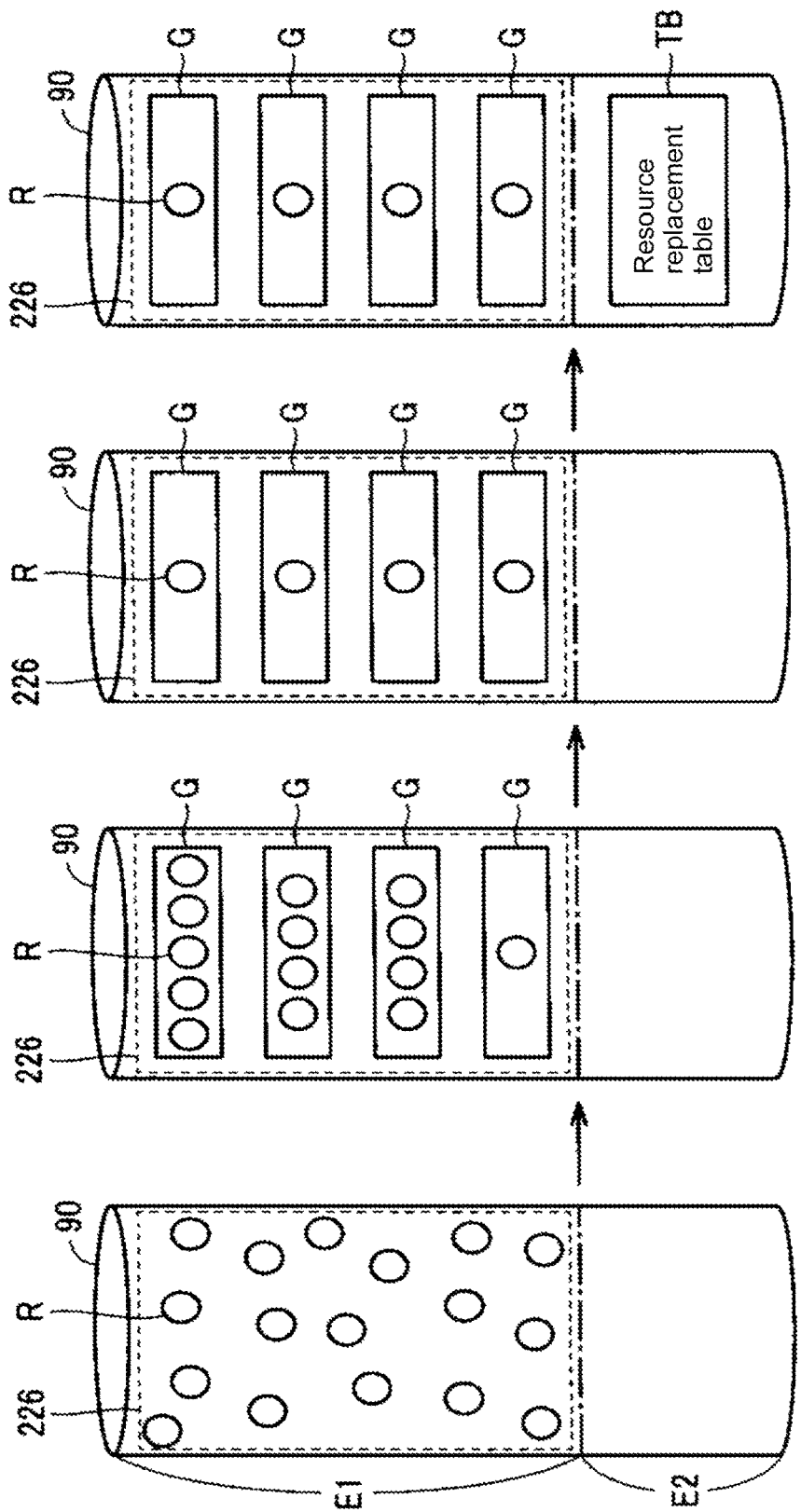
FIGS. 7A to 7D are schematic diagrams illustrating a process for deleting a resource R according to a first embodiment.

The deletion unit 55 deletes the resources R included in each group G shown in FIG. 7B except one resource R in each group G (step S6: refer to FIG. 7C). In the specific example of FIG. 10, two resources R are deleted from the group G11, and one resource R is deleted from the group G2. This reduces the total number of resources R included in the standard project 225 (specifically, the UI library 226).

The table generation unit 60 generates the resource replacement table TB (step S7: refer to FIG. 7D). The resource replacement table TB contains data indicating the correspondence between the deleted resources R and the replacement resource R (that is, the retained resource R) for each group G. In a first embodiment, the table generation unit 60 associates the file names of the deleted resources R and the file names of the retained resource R, and stores them in the resource replacement table TB.

Figure 10:
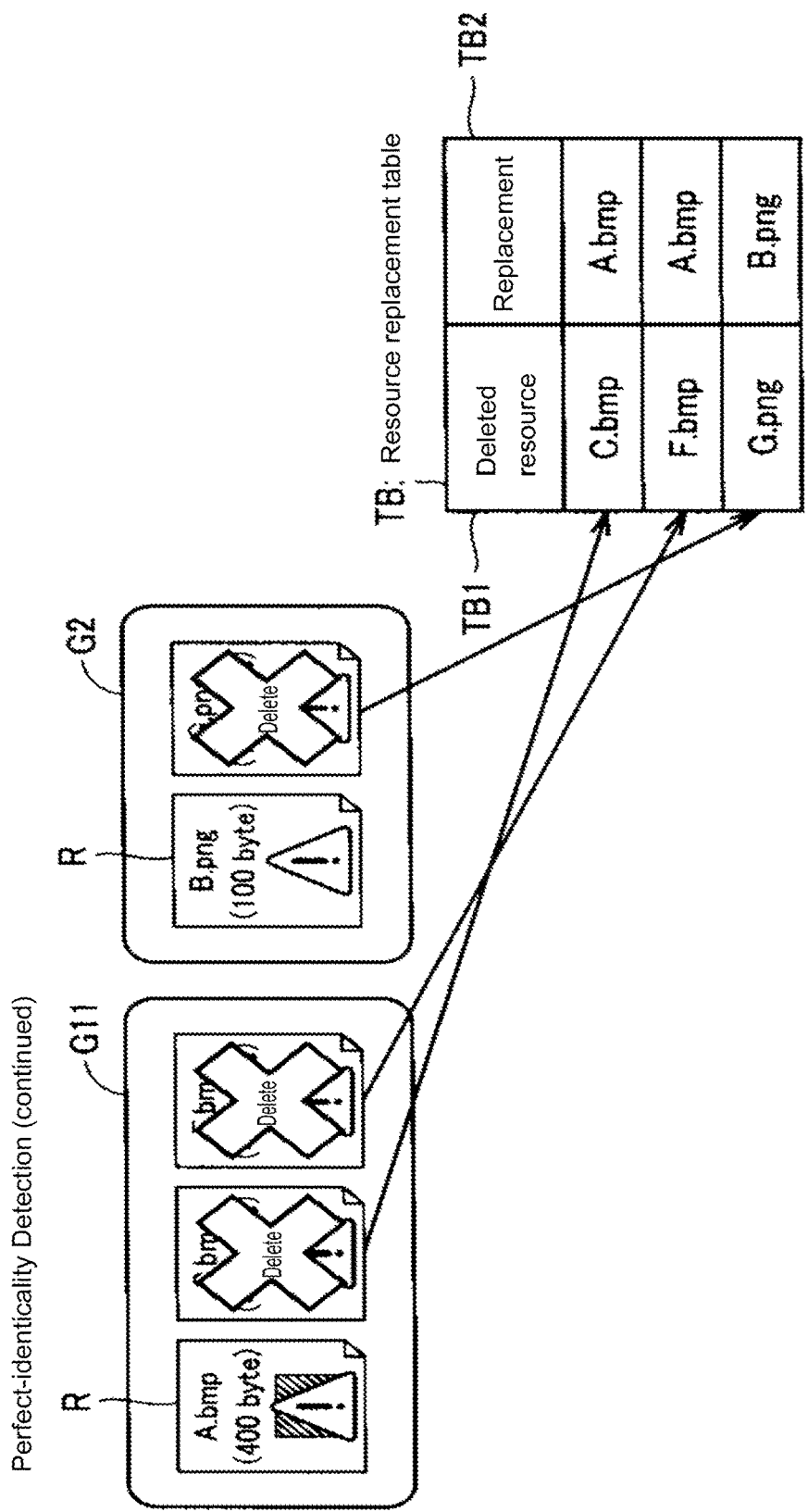
FIG. 10 is a diagram illustrating another example of a process for deleting a resource R according to a first embodiment.

In the specific example of FIG. 10, an identifier TB1 of the deleted resources R and a replacement identifier TB2 associated with the identifier TB1 are stored into the resource replacement table TB. For example, the file names (C.bmp and F.bmp) of the two resources R deleted from the group G11 are stored as the identifier TB1, and the file name of the retained resource R (A.bmp) is stored as the identifier TB2 associated with the identifier TB1. For the group G2, the file name (G.bmp) of the deleted resource R is stored as the identifier TB1, and the file name (B.bmp) of the retained resource R is stored as the identifier TB2 associated with the identifier TB1. The identifier of a resource R may not be the file name of the resource R.

In this manner, redundant resources R can be deleted to reduce the total number of resources R included in the standard project 225. The resource replacement table TB stores the association between the deleted resource R and the retained resource R.

Figure 11:
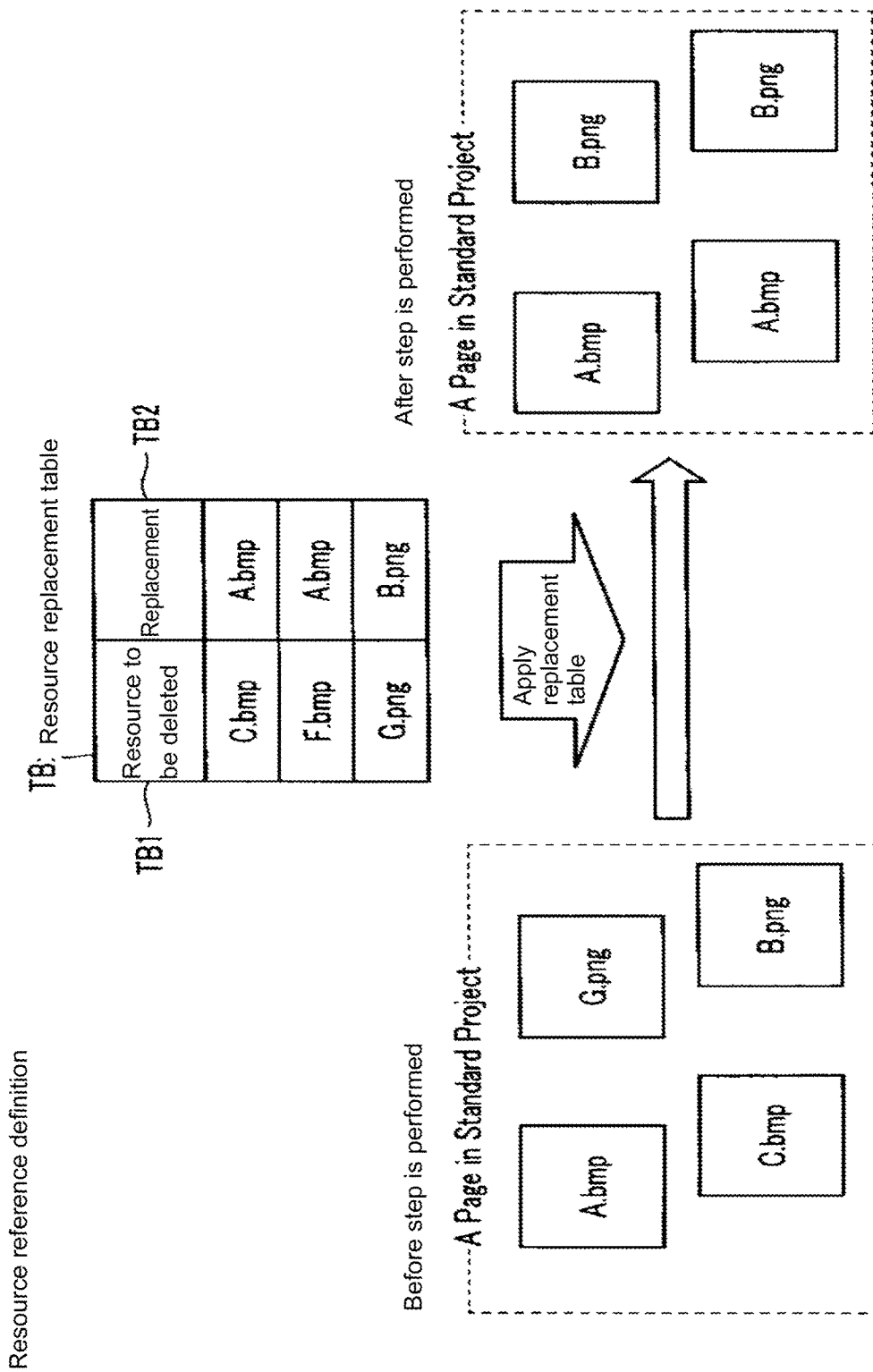
FIG. 11 is a diagram illustrating another example of a process for deleting a resource R according to a first embodiment.

The reference definition unit 70 then defines reference data for providing a reference to the retained resource R in each of these portions of the HMI program 227 in the standard project 225 that refer to the deleted resource R (step S8). More specifically, the reference definition unit 70 identifies the portions listing the file name of the deleted resource R of the resource replacement table TB in the process of parsing the HMI program 227. As shown in FIG. 11, the reference definition unit 70 changes (rewrites) the file name listed in the identified portions of the HMI program 227 to the associated file name (file name of the retained resource R) in the resource replacement table TB. This compiles the HMI program 227 to refer to the resource R retained after the deletion process.

After the compilation process performed by the compiler 10B, the executable project 229 is stored into the memory unit 90. The CPU 110 determines whether to accept or reject an instruction for transferring the executable project 229 from the user after the compilation process (step S9). While the CPU 110 determines to reject the transfer instruction (No in step S9), the processing in step S9 is repeated. When the CPU 110 determines to accept the transfer instruction (Yes in step S9), the CPU 110 reads the executable project 229 from the memory unit 90, and transfers the executable project 229 to the programmable terminal 4 (step S10). In this manner, the programmable terminal 4 may obtain the executable project 229 with the size reduced through the above deletion process of the resource R.

Example of Creating Redundant Resources

Figure 14:
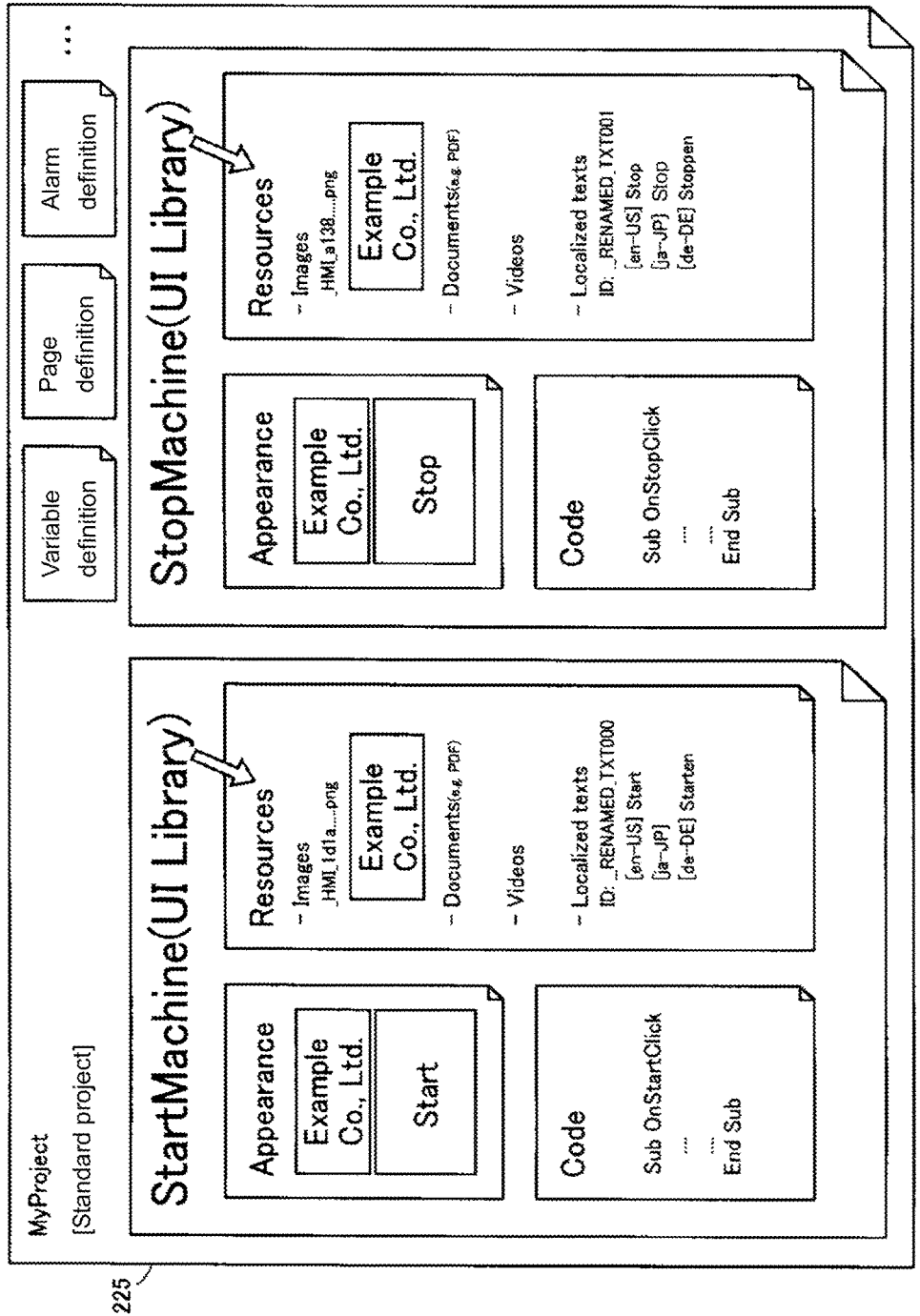
FIG. 14 is a diagram illustrating another example in which identical resources R are created.

FIGS. 12 to 16B are diagrams each describing an example in which the identical resources R are created. In the example described below with reference to these figures, the identical resources R are created when the standard project 225 is created using the editor 10A. The user first creates a UI library (A) that includes a resource for a button (UI data) for starting a machine, and also creates a UI library (B) that includes a resource for a button (UI data) for stopping the machine (refer to FIGS. 12 and 13). In each of the UI libraries, an image of the logo mark of the machine manufacturer (Example Co., Ltd) is placed above each of the buttons. The user imports both the UI libraries into a single standard project 225 (FIG. 14).

As shown in FIG. 14, each of the imported UI libraries includes resources R including images indicated with the arrows. To avoid conflict of the file names of resources between a plurality of UI libraries, the name of each file of the resources is to be changed to a unique name at import in FIG. 14.

Figure 15:
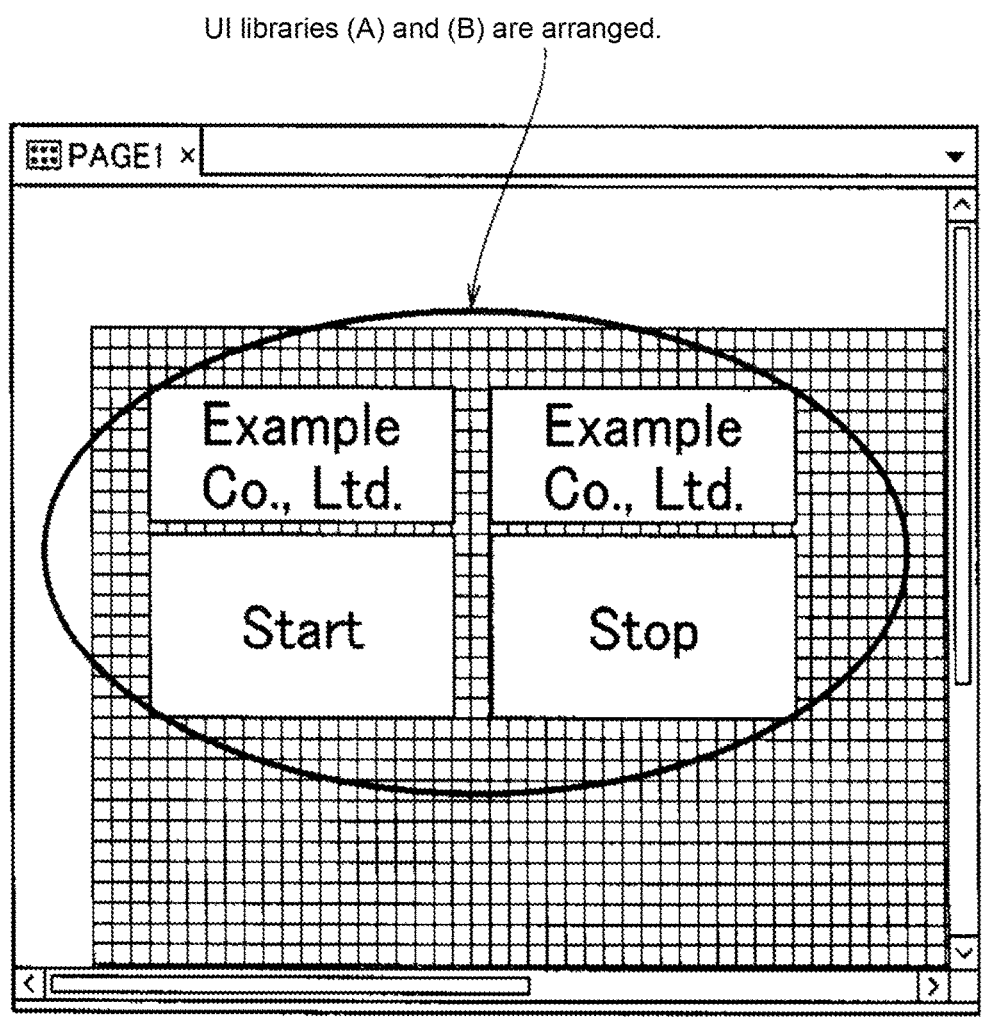
FIG. 15 is a diagram illustrating another example in which identical resources R are created.

In FIG. 15, the user places both the resources R on a screen (page), and determines the position of each resource R on the display screen. This completes the creation of the standard project 225.

Figure 16A:
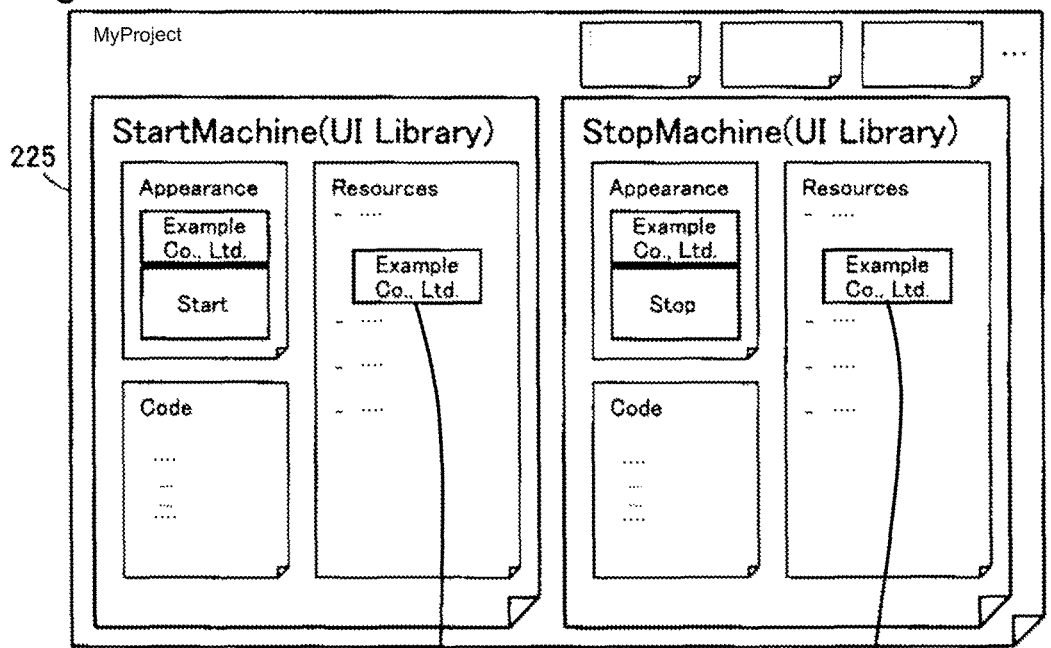
FIGS. 16A and 16B are diagrams illustrating another example in which identical resources R are created.
Figure 16B:
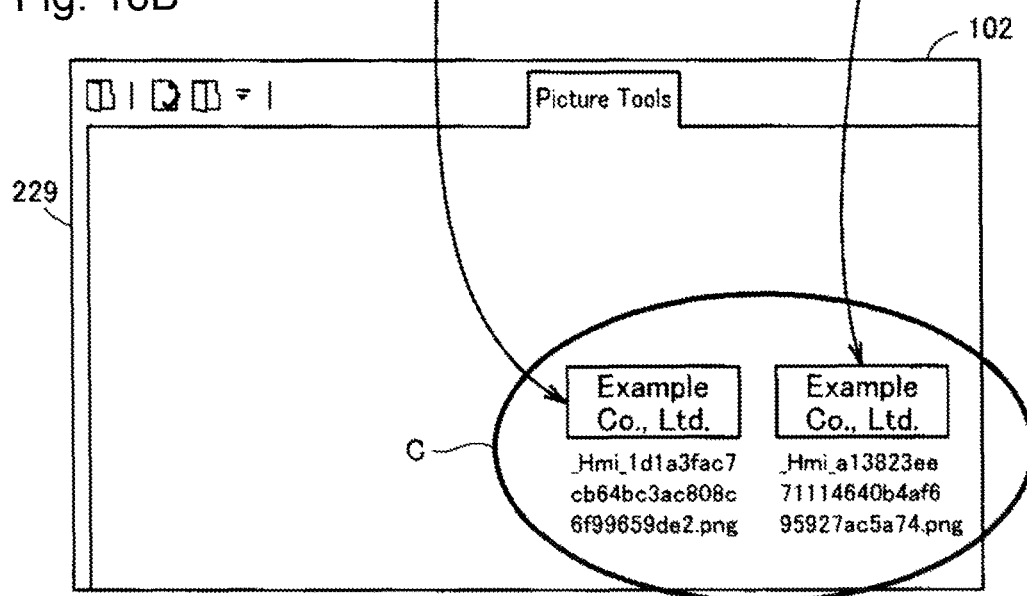

The created standard project 225 includes the identical resources R (refer to FIG. 16A). The executable project 229 thus includes redundant executable data for the identical resources R (refer to section C of FIG. 16B).

For the standard project 225 including redundant resources R as shown in FIG. 16A in a first embodiment, the redundant resources R may be detected when the standard project 225 is compiled. The above deletion process is then performed for the detected resources R.

First Modification

Modifications of a first embodiment described above will be described. A first embodiment uses the data identicality between sets of resource data as the criterion to determine the redundancy of resources R. For resources R representing images, their redundancy may be determined through preprocessing. For example, the grouping unit 20 performs preprocessing for grouping resources R representing similar images having the same width and the same height into groups and expanding the images of each group to uncompressed pixel data. The identical data detection unit 30 checks the expanded image data in units of pixels to detect the perfect data identicality.

Figure 17A:
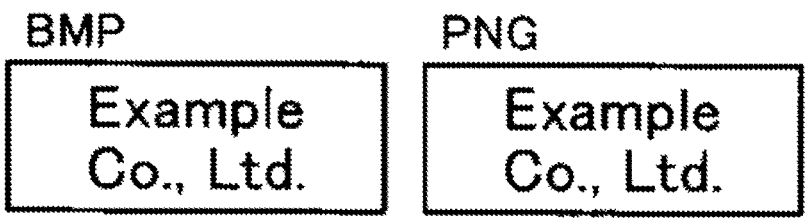
FIGS. 17A and 17B are schematic diagrams illustrating images of similar resources R according to a first embodiment.
Figure 17B:

FIGS. 17A and 17B are schematic diagrams showing images of similar resources R according to a first embodiment. In FIG. 17A, the resources R have different file formats but have the same details (same images). In FIG. 17B, one image is enlarged and the other is reduced, and these images have the same details (same images). In both these cases, the preprocessing described above allows the identical data detection unit 30 to detect the data identicality between these images.

Second Modification

Although the deletion unit 55 automatically deletes resources R when the resources R are determined to be redundant or similar in a first embodiment, such resources R may be deleted in accordance with an instruction from the user.

Figure 18:
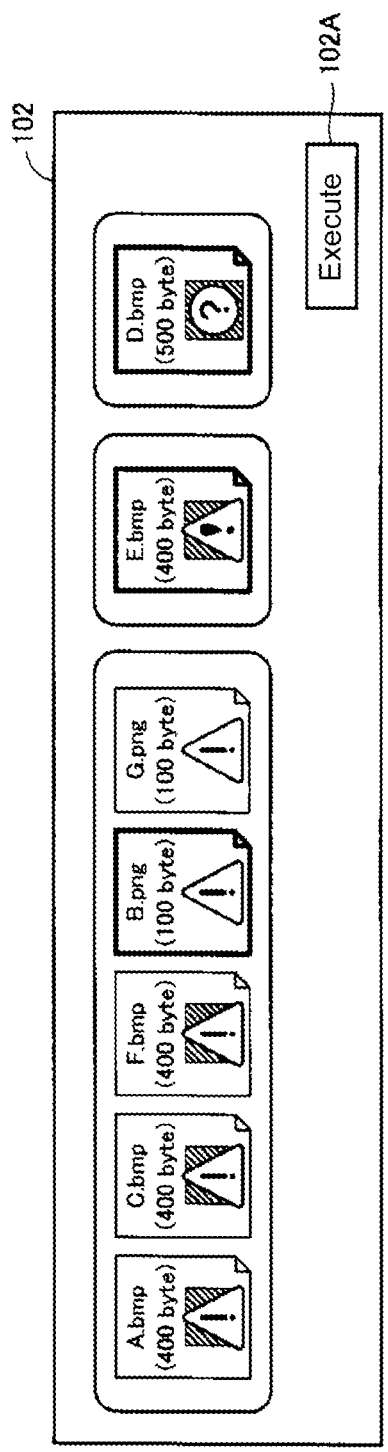
FIG. 18 is a diagram illustrating an example screen for prompting a user to designate whether to delete resources in a first embodiment.

FIG. 18 is a diagram showing an example screen for prompting the user to designate whether to delete resources in a first embodiment. As shown in FIG. 18, the display 102 displays a screen showing icons indicating the resources R in the same group output from the grouping unit 20 in the same circle. The screen prompts the user to designate whether to retain one resource R with a thick frame and delete the other resources R.

The user checks the prompt appearing on the screen. When the user does not intend to delete the redundant resource R and intends to retain the resource R, the user drags the icon of the resource R to be retained out of the circle. The user then operates an execution button 102A to create the executable project 229 of the standard project 225 retaining the resource R that has been moved out of the circle.

Third Modification

To display the resource replacement table TB on the display 102, the PC 100 generates display data from the resource replacement table TB, and outputs the generated display data to the display controller 120. This notifies the user of the deleted resources R, the retained resources R, and the replacement correspondence between the deleted resources R and the retained resources R. The display 102 may display the identifier of the UI library (e.g., the library name of the UI library) previously including the deleted resource R or the identifier of the UI library including the retained resource R.

Forth Modification

The identical data detection unit 30 may detect data identicality when UI data representing the UI library 226 is created. Although the identical data detection unit 30 described above detects the data identicality between resources R when the compiler 10B compiles the standard project 225, the identical data detection unit 30 may detect the data identicality in the manner described below at times other than during compilation.

More specifically, the user adds a resource R to the UI library using the editor 10A included in the PC 100. The user may also edit (create) a resource R by editing an existing resource R, and imports the edited UI library into the standard project 225. In response to this, the identical data detection unit 30 may detect redundant resources R, the deletion unit 55 may delete the resources R, and the reference definition unit 70 may define a reference.

The identical data detection unit 30 may then also detect the redundant resource R during compilation. In this case, the redundancy is detected during compilation in combination with the redundancy detected when UI data for the UI library 226 is created.

When the user explicitly instructs an optimization function of the resources R, the data identicality between the resources R for the UI library 226 may be detected. The deletion unit 55 may then delete the same (or redundant) resources R.

Fifth Modification

The reference definition unit 70 included in the PC 100 may perform the reference defining process described above for the executable HMI program after the compilation process, rather than during the compilation process, or when the programmable terminal 4 receives an instruction for transfer to the executable project 229.

Second Embodiment

A second embodiment is a modification of a first embodiment described above. In a second embodiment, the programmable terminal 4 detects the data identicality between resources R, performs the deletion process, and performs the reference defining process. In this case, the programmable terminal 4 is one embodiment of the program processing apparatus described above.

In a second embodiment, the PC 100 compiles the standard project 225, but does not detect the data identicality between resources R during compilation. The executable project 229 resulting from the compilation process may include the redundant resources R when they are transferred to the programmable terminal 4.

The CPU 411 included in the programmable terminal 4 performs the grouping process (steps S3, S4, and S5), the deletion process (step S6), the table generating process (step S7), and the reference defining process (step S8) described in a first embodiment for the resources R for the UI library 226 included in the executable project 229 received from the PC 100.

The programmable terminal 4 may also detect redundant resources, delete the resources R, and perform the reference defining process as described above in response to an instruction from the user.

Third Embodiment

A third embodiment is a modification of a first embodiment or a second embodiment. In a third embodiment, the PC 100 and the programmable terminal 4 operate in cooperation with each other to perform the grouping process (steps S3, S4, and S5), the deletion process (step S6), the table generating process (step S7), and the reference defining process (step S8).

For example, the PC 100 performs the grouping process (step S3, S4, and S5), the deletion process (step S6), and the table generating process (step S7) for the standard project 225 to generate the executable project 229. The PC 100 then transfers the executable project 229 and the resource replacement table TB to the programmable terminal 4.

After receiving the executable project 229 and the resource replacement table TB from the PC 100, the programmable terminal 4 defines a reference in the HMI program 227 of the executable project 229 by referring to the resource replacement table TB.

Structure in Embodiments

Embodiments described above describe the structure below.

The program processing apparatus (the PC 100 and the programmable terminal 4) executes an HMI program intended for FA. This program processing apparatus includes a plurality of libraries (UI libraries) for storing UI data (resources R) corresponding to the UI functions of the HMI program 227, and a control unit (the CPU 110 and the CPU 411) for controlling the program processing apparatus. The control unit includes the identical data detection unit 30, which detects the same UI data from a plurality of sets of UI data stored in different libraries based on at least the data type and the data size, and the deletion unit 55, which deletes the UI data determined to be identical from the libraries, while retaining a single set of UI data.

The structure above retains a single set of UI data and deletes the other sets of UI data (from the library) to reduce the amount of data stored in the library. Such less data reduces the memory area used to store data (including UI data) associated with the HMI program 227, and increases the data transfer rate.

The identical data detection unit 30 detects the same UI data when UI data (resource R) is created for a library (UI library). This prevents the same UI data as the UI data stored in a library from being created and stored into the library when the library is created.

The identical data detection unit 30 detects the above data identicality when the HMI program 227 is compiled. This allows the same UI data to be detected and deleted during the compilation process.

UI data (resource R) is referred to in the HMI program 227. The control unit further includes the reference definition unit 70, which defines reference data for providing a reference to the retained UI data in portions of the HMI program 227 that refer to the deleted UI data. When UI data referred to by a portion of the HMI program 227 is deleted, this structure may define data for providing a reference to the retained UI data (the same UI data as the deleted UI data) in the portion. This can retain the data identicality of the HMI program before and after the UI data is deleted.

The reference definition unit 70 defines reference data when the HMI program 227 is compiled. This allows reference data to be defined during compilation.

In some embodiments, the program processing apparatus includes the display 102 and the display controller 120 for controlling the display 102 in accordance with display data. The control unit further includes a generation unit (table generation unit 60), which generates information (resource replacement table TB) associating the identifier of the deleted UI data (file name of the resource R) with the identifier of the retained UI data (file name of the resource R) that is defined as the reference to the deleted UI data. The control unit outputs display data for displaying the generated association information to the display controller.

This structure allows the user to determine changes in the reference of the UI data in the HMI program 227, and also allows the user to identify the deleted UI data and the retained UI data.

The embodiments disclosed herein are only illustrative in all respects and should not be construed to be restrictive. The scope of the present invention is determined not by the description given above but by the claims, and is construed as including any modification that comes within the meaning and range of equivalency of the claims.

REFERENCE SIGNS LIST

4 programmable terminal
10A editor
10B compiler
11 system bus
12 power supply unit
15 detection sensor
16 relay
20 grouping unit
30 identical data detection unit
40 segmentation unit
50 change unit
55 deletion unit
60 table generation unit
70 reference definition unit
80 interface unit
90 memory unit
102, 107, 481 display
102A execution button
104 keyboard
106, 420 memory card
108, 416 operation key
111 communication channel
112 memory
113 timer
114 hard disk drive
118 input interface
120 display controller
124,419 communication interface
126,417 data reader/writer
128 bus
221 device tool program
224 library
225 standard project
227 program
228 definition file
229 executable project
414 ROM
415 clock
418 touch screen
482 touch panel
TB resource replacement table

The invention claimed is:

1. A program processing apparatus for processing a human machine interface program for factory automation, the apparatus comprising a processor configured with a program to perform operations comprising:

operation as a grouping unit configured to group pieces of user interface data, each of the pieces of user interface data comprising a type and a size, into a plurality of groups based on the type and the size such that, within each of the plurality of groups, each piece of user interface data comprises a same type and a same size;

operation as an identical data detection unit configured to detect, based on at least the type and the size, identical pieces of user interface data within each of the plurality of groups;

operation as a segmentation unit configured to group the pieces of user interface data into a second plurality of groups such that each group of the second plurality of groups comprises only identical pieces of user interface data;

operation as a change unit configured to change each group of the second plurality of groups to comprise only one of the identical pieces of user interface data, wherein the identical pieces of user interface data comprise a first piece of user interface data and a second piece of user interface data;

operation as a reference definition unit configured to define, in a portion of the human machine interface program that refers to the second piece of user interface data, reference data that refers to the first piece of user interface data; and operation as a generation unit configured to generate association information between an identifier of the second piece of user interface data and an identifier of the first piece of user interface data defined in the portion referred to by the second piece of user interface data.

2. The program processing apparatus according to claim 1, wherein the pieces of user interface data are stored in a plurality of libraries; and, the processor is configured with the program to perform operations:

such that operation as the identical data detection unit comprises operations as the identical data detection unit configured to detect identical pieces of user interface data from pieces of user interface data stored in different libraries;

further comprising operation as a library change unit configured to change the libraries such that each library comprises no duplicate pieces of user interface data.

3. The program processing apparatus according to claim 1, wherein the processor is configured with the program to perform operations such that operation as the identical data detection unit comprises operation as the identical data detection unit that detects identical pieces of user interface data in response to the plurality of groups being created.

4. The program processing apparatus according to claim 1, wherein the processor is configured with the program to perform operations such that operation as the identical data detection unit comprises operation as the identical data detection unit that detects identical pieces of user interface data when the human machine interface program is compiled.

5. The program processing apparatus according to claim 1, wherein the processor is configured with the program such that operation as the reference definition unit comprises operation as the reference definition unit that defines the reference data when the human machine interface program is compiled.

6. The program processing apparatus according to claim 1, further comprising:

a display; and a display controller configured to control the display in accordance with display data, wherein the processor is configured with the program to perform operations comprising outputting the display data for displaying the generated association information to the display controller.

7. A non-transitory computer-readable recording medium storing a program for causing a processor included in an information processing apparatus to perform operations of a method for processing a human machine interface program for factory automation, the operations comprising:

grouping pieces of user interface data, each of the pieces of user interface data comprising a type and a size, into a plurality of groups based on the type and the size such that, within each of the plurality of groups, each piece of user interface data comprises a same type and a same size, detecting identical pieces of user interface data within each of the plurality of groups, grouping the pieces of user interface data into a second plurality of groups such that each group of the second plurality of groups comprises only identical pieces of user interface data, changing each group of the second plurality of groups to comprise only one of the identical pieces of user interface data, defining, in a portion of the human machine interface program that refers to a second piece of user interface data, reference data that refers to a first piece of user interface data; and generating association information between an identifier of the second piece of user interface data and an identifier of the first piece of user interface data defined in the portion referred to by the second piece of user interface data.

8. A method for processing a human machine interface program for factory automation, the method comprising:

grouping pieces of user interface data, each of the pieces of user interface data comprising a type and a size, into a plurality of groups based on the type and the size such that, within each of the plurality of groups, each piece of user interface data comprises a same type and a same size;

detecting identical pieces of user interface data within each of the plurality of groups;

grouping the pieces of user interface data into a second plurality of groups such that each group of the second plurality of groups comprises only identical pieces of user interface data;

changing each group of the second plurality of groups to comprise only one of the identical pieces of user interface data, defining, in a portion of the human machine interface program that refers to a second piece of user interface data, reference data that refers to a first piece of user interface data; and generating association information between an identifier of the second piece of user interface data and an identifier of the first piece of user interface data defined in the portion referred to by the second piece of user interface data.

* * * * *